Patented May 13, 1930

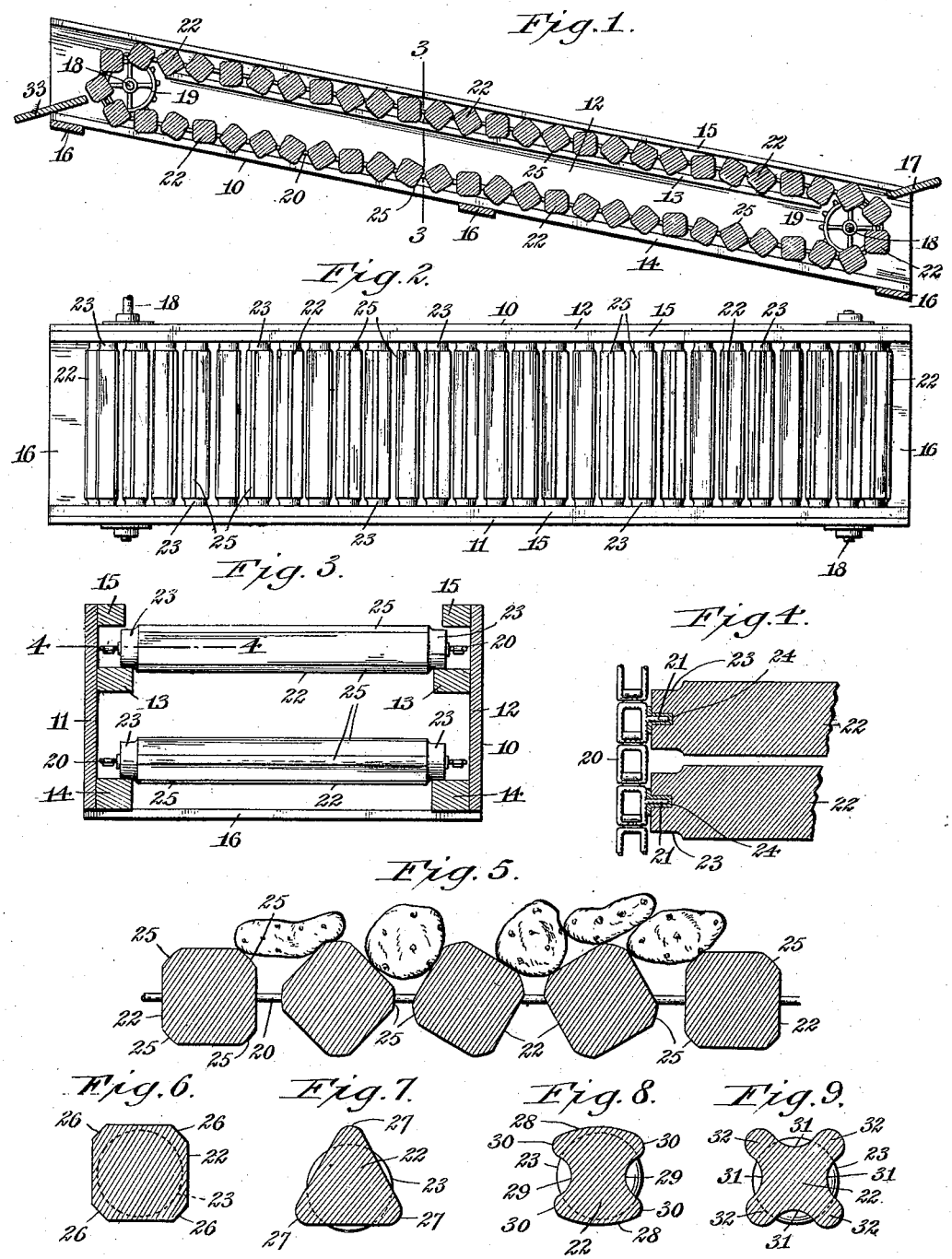

1,758,603

UNITED STATES PATENT OFFICE

GEORGE S. HELENBOLT, OF MIDDLEPORT, NEW YORK, ASSIGNOR TO NIAGARA SPRAYER & CHEMICAL CO., INC., OF MIDDLEPORT, NEW YORK, A CORPORATION OF NEW YORK

FRUIT AND VEGETABLE GRADING MACHINE

Application filed August 7, 1925. Serial No. 48,736.

My invention relates to improvements in grading machines, and more particularly to fruit or vegetable grading machines.

Grading machines of the type to which this invention is applied, are usually provided with conveyers to receive and direct the fruit or vegetables to the grading mechanism and such conveyers are adapted to permit of inspection of the fruit or vegetables during the travel of the latter over such conveyers. However, so far as known, conveyers of this type were either in the form of flat belts, or made up of an endless series of cylindrical or substantially cylindrical rollers; the first permitting only a superficial inspection of the fruit or vegetables, and the second being suitable only for fruit or vegetables having or approaching a spherical form, since elongated or irregularly-shaped fruit or vegetables cannot, by means of cylindrical rollers, or rollers of approximately cylindrical form, be turned over to expose all surfaces thereof. Consequently fruit or vegetables of elongated or irregular formation are invariably graded by hand.

The object of my invention is to provide means within a grading machine for supporting, conveying, and simultaneously turning over, for inspection, fruit or vegetables of elongated or irregular formation, and particularly for inspection of potatoes.

Another object of my invention is to provide an endless conveyer onto which fruit or vegetables are to be placed and carried along a straight-line course in a horizontal or an inclined plane, and to so construct the elements constituting the conveyer that they will effectually turn over fruit or vegetables of irregular formation.

A still further object of my invention is to provide, in a grading machine, a conveyer having spaced endless chains or carriers guided in their travel and rotatably-supported non-cylindrical supporting elements for conveying and turning fruit or vegetables while being conveyed.

Another object of my invention is to provide, in a grading machine, an endless conveyer having an endless series of spaced end-supported rollers and a track on which portions of said rollers travel and cause rotation of the same; and in providing said rollers with non-cylindrical portions serving to support, convey and turn the fruit or vegetables placed thereon while being carried forward by said conveyer.

A still further object of my invention is to provide, in a grading machine, a conveyer having an endless series of rotatably-supported rollers provided along the major portion of its length with substantially square portions in cross section.

With the above and other objects in view, my invention consists in the novel features of construction and in the arrangement and combination of parts to be hereinafter described and more particularly pointed out in the subjoined claims.

In certain types of grading machines, or what are sometimes termed sizing machines, an endless conveyer is provided at the receiving end of the machine, and by means of this conveyer fruit or vegetables are carried forward to the grading or sizing mechanism of the machine, and in the drawings,—

Fig. 1 is a longitudinal section through such a conveyer constructed in accordance with my invention.

Fig. 2 is a plan view of the same.

Fig. 3 is an enlarged transverse section taken on line 3—3, Fig. 1.

Fig. 4 is an enlarged horizontal section through a portion of the conveyer taken on line 4—4, Fig. 3, the frame work of the conveyer being omitted.

Fig. 5 is an enlarged longitudinal section through a portion of the upper stretch of the conveyer showing the manner in which the fruit or vegetable-supporting, conveying, and turning elements are shaped in cross section under my preferred arrangement.

Fig. 6, 7, 8 and 9, are transverse sections of modified forms of supporting, conveying, and turning elements, or rollers as they may be termed.

Having reference to the drawings in detail, the conveyer comprises a suitable frame work 10 supported from the floor or otherwise in any approved manner, and as conveyers of this type are invariably inclined upwardly from their receiving ends, I have so illustrated the same in Fig. 1.

The frame work comprises two side members 11, 12, spaced apart, and each is formed of a flat element, to the inner side of which two pairs of supporting tracks 13, 14 are secured. Above and spaced from the upper pair of tracks 13 are retainer rails 15, these rails being also secured to the inner sides of the flat elements of said side members. The side members 11 and 12 are connected together at their lower edges by cross pieces 16, or in any other suitable manner, thus holding said side members in spaced relation and maintaining the supporting tracks of each pair in horizontal or inclined alinement, as the case may be, and in properly spaced relation.

At one end of the frame a downwardly-inclined chute or feed table 17 is provided. Said chute or table may form a part of a hopper into which fruit or vegetables are delivered, and by means of which such fruit or vegetables are advanced onto the conveyer, to be hereinafter described, all of which, however, is common in the art to which this invention relates.

At each end of the frame work is a transversely-disposed shaft 18, one of which may be driven in any suitable manner and the other be idle or, if desired, said other may be utilized for driving other parts of the grading machine to which this invention is applied, all of which I lay no claim to and make reference only to the same for the purpose of more clearly representing this invention.

On each of the shafts 18, two transversely-spaced sprocket wheels 19 are secured, one in close proximity to the flat element of each side member. These sprocket wheels may therefore be said to be arranged in pairs, one of each pair being on each shaft 18 and being longitudinally alined with each other. Around each pair of sprocket wheels, an endless chain 20 is caused to travel, these chains being vertically-alined with the supporting tracks 13, 14, the upper stretches of the two chains traveling above and being spaced from the upper supporting tracks 13 and the lower stretches traveling above and being spaced from the lower supporting tracks 14. These endless chains are of the conventional type, except that at regular intervals, certain links of each chain are provided with inwardly-directed cylindrical studs 21.

The conveyer includes means to support, convey and turn fruit or vegetables, and this means is in the form of elongated elements or, what may be termed rollers, 22, non-cylindrically shaped in cross section along their major portion, the ends of these elements or rollers being cylindrical, as at 23, and being adapted to be supported by and travel in contact with the supporting rails 13 and 14. These elements or rollers are therefore arranged in an endless series in which an upper stretch and a lower stretch parallel therewith, are provided. Each of these elements or rollers 22 has a metallic bushing 24 inserted or driven into each end thereof and the studs 21 extending inwardly from the two endless chains are entered in said bushings. Therefore, when rotating one of the shafts 18 by any suitable means, the chain is caused to travel in an endless manner and owing to the fact that the elements or rollers 22 are rotatably mounted on the chain and the cylindrical ends of these rollers travel in contact with the supporting rails 13 and 14, said elements or rollers are caused to rotate by the frictional contact with said tracks while traveling forwardly and serving as the upper stretch of the conveyer, and when traveling rearwardly and serving as the lower stretch of the conveyer. These rollers, when traveling from the lower stretch to the upper stretch at one end of the conveyer, and from the upper stretch to the lower stretch at the other end of the conveyer, may be non-rotatable, since at these points no fruit or vegetable is supported by the conveyer; and although no fruit or vegetable is supported by the lower stretch of conveyer, it is desirable to have the elements or rollers 24 travel in contact with the lower tracks 14 so as to maintain the lower stretch in a straight line rather than have the same hanging between the sprocket wheels unsupported. The elongated elements or rollers, by reason of being rotated by frictional and rolling contact with the tracks, are continuously, but not positively, rotatable while forming part of the straight-lined active or effective stretch of the conveyer. Each, therefore, is individually subjected to slippage on the tracks, which has been found very desirable when irregularly shaped fruit or vegetables are being conveyed thereby and turned over for inspection. Such slippage occurs continually and results in irregular rotation of the conveying and turning elements or rollers, and this is augmented when an irregular shaped fruit or vegetable unit is being lowered or elevated from one element or roller to the other. Moreover, such slippage is found absolutely necessary to avoid the squashing of fruit or vegetables which would occur with any positively driven elements or rollers. The slippage of the rollers may occur only under certain conditions, and invariably is accompanied by rotating movement of the rollers, although such movement might be slightly retarded by reason of slight slippage. In effect, the rollers are therefore continuously rotatable, although any one may be individually retarded by reason of slight slippage, and may even be momentarily held against rotation under unusual conditions.

Each of the elements or rollers 22 is individually journaled independently of the remaining rollers, and owing to the fact that they are of non-cylindrical formation in cross section, they are not positively driven and are always irregularly disposed. For example, in the preferred construction illustrated in Figs. 1 to 5, these rollers are of substantially square formation in cross section with rounded angles or corners 25, and they are spaced apart to permit each to rotate independent of the others without coming in contact with adjacent rollers. By making the rollers non-cylindrical and preferably square in cross section, corresponding sides of adjacent rollers may be differently inclined, or one may have opposite sides vertical or horizontal, while an adjacent or the adjacent rollers have all sides at an inclination, as clearly shown in Figs. 1 and 5; thereby forming differently shaped and different sizes of spaces between adjacent rollers. Consequently, fruit or vegetables delivered onto the upper stretch of the endless series of rollers from the chute or feeding table 17 are carried forwardly, and at the same time tumbled by the rotary movement of the elements or rollers 22, with the result that all sides of the fruit or vegetables will be exposed for examination during their travel, regardless of their being of regular shape, or whether elongated or irregularly formed; this being clearly illustrated in Fig. 5 of the drawings.

While I have used elements or rollers of various non-cylindrical forms for experimental purposes, square, or substantially square elements or rollers having the corners cut away by rounding the same, have proved to possess advantages over any other type of non-cylindrical roller experimented with. However, non-cylindrical rollers of other cross sectional formations contain decided advantages over the cylindrical form of roller, such as invariably used, and different types of these are illustrated in Figs. 6 to 9, in which these elements or rollers are shown in cross section. It is, however, highly essential that each elongated element or roller has one or more elongated regions projecting a considerably greater distance from its axis than other elongated regions. For example,—an element or roller of this kind of substantially square formation, such as shown in Figs. 5 and 6, has its sides gradually recede toward its axis from each cut-away corner; thus the corners form outwardly-projecting elongated regions, and during the rotation of the elements or rollers serve to lift or lower one end of a fruit or vegetable unit and set it on the adjacent elements or rollers while turning over the fruit or vegetable; especially so when the fruit or vegetable offers slight resistance to the rotation of one or another element or roller and causes one to slip slightly while the adjacent element or roller continues rotation. This invariably causes a complete turning over of the fruit or vegetables, and especially so when the elements or rollers are of square formation in cross section and provide irregular spaces of decidedly different shapes and sizes between the elements or rollers, as clearly shown in Fig. 5.

The formation of the element or roller shown in Fig. 6 is substantially the same as that shown in the preferred construction, with the exception that the corners are chamfered, as at 26, and while this construction is fully as advantageous as the preferred construction when conveying hardy fruit or vegetables not easily bruised, the flat or chamfered corners provided, seemingly create sharper angles which are more likely to bruise delicate fruit or vegetables than the rounded corners shown in the preferred construction.

In Fig. 7 the element or roller 22 therein shown is of triangular formation in cross section, the angles or corners being rounded, as at 27. This construction provides flat sides, as in the preferred construction, and decided elongated projecting portions, which are essential to cause turning over of the fruit or vegetables.

In Fig. 8 a further modified form of element or roller is shown in cross section, diametrically-opposite portions thereof being convex, as at 28, and between these convex portions, the element or roller is provided with deep longitudinal grooves, as at 29. This element or roller may therefore be said to have two opposite convex sides and two opposite concaved or grooved sides, the concaved portions merging into the flat portions by rounded parts 30.

In Fig. 9, the element or roller 22 therein shown, is provided with deep longitudinal grooves at four sides, as at 31; these grooves in reality forming four longitudinal ribs 32, the outer edges of which are rounded.

Various other forms of non-cylindrical elements or rollers may be designed; and while all may be found suitable for the purpose intended, some may possess advantages over others. All, however, will fall fully within the scope of this invention, as set out in the subjoined claims.

It will be noted that the cylindrical ends of the elements or rollers 22 shown in Figs. 6 to 8, are of greater diameter than the transverse dimension through certain parts of these rollers, but this may be varied to suit the user. It is, however, to be made clear that in a conveyer of this type, the rotation of the elements or rollers 22 are not to be too fast and therefore a roller having its cylindrical ends of a definite diameter may result in such diameter being greater than the transverse dimension through certain parts of a roller when such roller is of a certain cross sectional formation, while rollers of other cross sectional formations may have all parts intermediate its cylindrical ends of greater transverse dimension or diameter than the diameter of the cylindrical ends.

At the distant or delivery end of the conveyer, fruit or vegetables are delivered onto an inclined table or chute 33, and by this element directed to the grading or sizing mechanism of the machine, which may be of any desired construction and mode of operation, since the grading or sizing mechanism forms no part of this invention.

Having thus described my invention, what I claim is:—

1. In a fruit or vegetable grading or sizing machine, means for delivering fruit or vegetables to the grading mechanism of said machine, comprising frictionally rotatable elements adapted to travel in a straight line and each being of non-cylindrical formation and each having elongated projecting regions, said elements being arranged in close relation to turn over the fruit or vegetables for inspection and to prevent the passage of fruit or vegetables therebetween.

2. In a fruit or vegetable grading or sizing machine, a conveyer comprising rollers, and means adapted to support, convey, and simultaneously turn fruit or vegetables supported on said conveyer to display their various surfaces for inspection and to permit of removal of any of the fruit or vegetables by hand, said means comprising individually and frictionally rotatable elements arranged in series in closely spaced relation to prevent the passage of fruit or vegetables therebetween and each element being of non-cylindrical formation in cross section to turn over the fruit or vegetables for inspection.

3. In a fruit or vegetable grading or sizing machine, roller means adapted to support, convey, and simultaneously turn fruit or vegetables to display their various surfaces for inspection and to permit of removal of any fruit or vegetables by hand, said roller means comprising a series of individually rotatable supporting elements connected in closely spaced-apart relation to turn over the fruit or vegetables and to prevent the passage of fruit or vegetables therebetween, each of said supporting elements being of non-cylindrical formation in cross section to provide elongated projecting regions, at least along part thereof, and means to non-positively rotate each supporting element as it travels.

4. In a fruit or vegetable grading or sizing machine, a fruit or vegetable conveyer, comprising an endless series of traveling spaced-apart frictionally rotatable rollers having cylindrical ends and non-cylindrical intermediate portions with circumferentially spaced elongated projecting regions along each of said intermediate portions, said rollers being closely spaced apart to prevent fruit or vegetables passing therebetween and acting during rotation to turn the fruit or vegetables for observation, and tracks to support said cylindrical ends and cause rotation of said rollers when traveling.

5. In a fruit or vegetable grading or sizing machine, a fruit or vegetable conveyer comprising a frame having spaced sides, each side having an upper and a lower track, an endless conveyer comprising sprocket wheels, two endless sprocket chains in spaced relation passing over said sprocket wheels, and rollers carried by said chains in closely spaced relation to prevent the passage of fruit or vegetables therebetween, each of said rollers having cylindrical ends traveling in contact with said tracks and a non-cylindrical portion between said ends, said rollers being rotated by frictional contact of the cylindrical ends thereof with said tracks but permitting slippage along said tracks under resistance and being carried in an endless course by said chains.

6. In a fruit or vegetable grading or sizing machine, an endless conveyer including fruit or vegetable supporting, conveying, and turning mechanism, comprising spaced-apart supporting elements having cylindrical ends and being of substantially square formation in cross section between said ends with the corners thereof cut away, said supporting elements being arranged in close relation to turn over the fruit or vegetables for inspection and to prevent the passage of fruit or vegetables therebetween tracks in contact with which said cylindrical ends travel to cause said rollers to rotate, and means to cause said conveyer to travel through an endless course.

7. In a fruit or vegetable grading or sizing machine, a fruit or vegetable conveyer of the endless type comprising spaced-apart supporting elements of non-cylindrical formation in cross section, said supporting elements being closely spaced to prevent the passage of fruit or vegetables therebetween, means to cause said conveyer to travel through an endless course, and means to cause said supporting elements to rotate under friction permitting slippage while traveling along said endless course.

8. In a fruit or vegetable grading or sizing machine, a fruit or vegetable conveyer comprising spaced-apart side members having tracks on their inner sides, longitudinally-spaced transverse shafts supported in said sides, sprocket wheels on said shafts arranged in pairs, an endless chain traveling over each pair of sprocket wheels, roller supports for the fruit or vegetable rotatably supported by said chains and being arranged in an endless series in closely spaced-apart relation to prevent the passage of fruit or vegetables therebetween, each roller support having cylindrical ends and a non-cylindrical portion between said cylindrical ends providing spaced elongated projecting regions, said cylindrical ends traveling in contact with said tracks and being rotated by the frictional contact therewith, means for delivering fruit or vegetables onto said conveyer, and means for receiving fruit or vegetables from said conveyer.

9. A fruit or vegetable grading machine having a conveyer formed of spaced individually rotatable frictionally driven conveyer elements arranged in close relation to prevent the passage of fruit or vegetables therebetween, each conveyer element having at least a portion thereof of non-cylindrical formation in cross section providing spaced elongated projecting regions.

10. A fruit or vegetable grading machine having a conveyer formed of individually rotatable conveyer rolls spaced relatively to prevent the passage of fruit or vegetables therebetween, each conveyer roll being of substantially square formation in cross section along a region between its end portions.

11. A fruit or vegetable grading machine having a conveyer formed of conveyer rolls relatively disposed to prevent the passage of fruit or vegetables therebetween, each conveyer roll having a portion between its ends provided with four flat sides of equal widths and cut away corners.

In testimony whereof I affix my signature.

GEORGE S. HELENBOLT.